Patented June 12, 1945

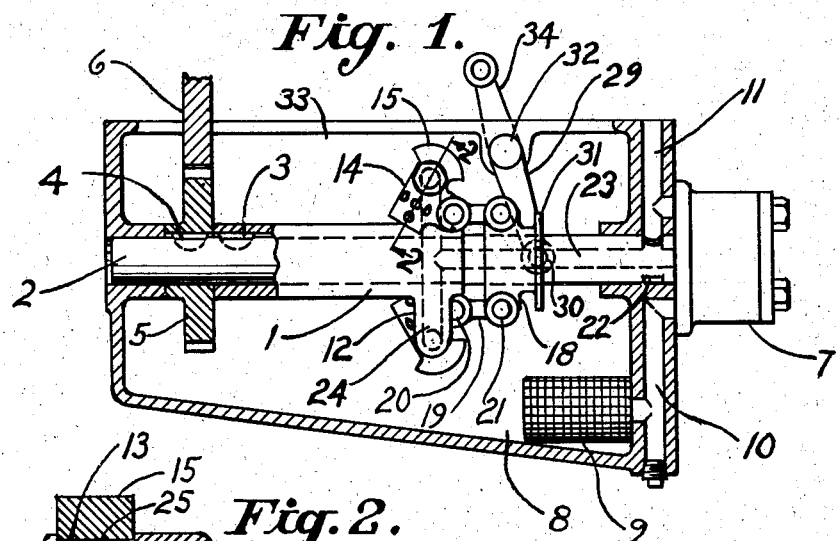

2,378,158

UNITED STATES PATENT OFFICE 2,378,158

HYDRAULIC GOVERNOR CONTROL

Clifton R. Roche, Los Angeles, Calif.

Application June 26, 1942, Serial No. 448,599

4 Claims. (Cl. 264—14)

My invention relates to centrifugal type governors, and relates particularly to governors for controlling a hydraulic pressure which in turn may be used to control other mechanisms.

The present application is a continuation-in-part of my prior application Serial Number 353,253, filed on the 19th day of August, 1940.

One of the objects of my invention is to provide a governor which in response to speed values, will vary the pressure of a fluid that may be used to control other mechanisms.

A further object of my invention is to provide a governor with means for adjusting while in operation, to various relations of fluid pressures in respect to speed values.

Further objects and advantages of the invention will be made evident throughout the following part of the specification.

Referring to the drawing which is for illustrative purpose only,

Fig. 1 is a vertically longitudinally sectioned view through a preferred embodiment of my invention.

Fig. 2 is a sectioned view of one of the control valves taken on a plane represented by the line 2—2 of Fig. 1, but assumed that the valve has been swung to a vertical position.

Fig. 3 is a sectioned view of an embodiment of my invention having a control valve of different design than that shown in Fig. 2. One of the valves has been cut away in this view.

Referring to the drawing, my invention includes a governor body 1 which is mounted for rotation on a shaft 2 by a key 3. This shaft is driven through a key 4 by a gear 5 whose teeth mesh with gear teeth 6 which is a part of the driving mechanism. If the governor is to govern an automatic transmission, the gear 6 will be a gear that rotates in respect to a member, or element of the transmission. The shaft 2 may also serve to drive a fluid pump 7 which draws in fluid from a sump 8 through a strainer 9 and through a passage 10. The pump forces the fluid under pressure to passage 11 which leads to the mechanism that is to be controlled by the pressure of the fluid.

The governor is constructed with arms 12, having extensions 13 upon which may swing members or valve bodies 14. To prevent the centrifugal force from acting to swing the valve bodies, counterweights 15 are provided. In each of the valve bodies is a valve 16 which is forced against a valve seat 16a, partially by means of a spring 17, and partially due to the centrifugal force caused by the weight, or mass of the valve 16 being rotated about the axis of the shaft 2. The spring 17, may or may not be used according to the desired characteristics. If used, the spring may be held in place by a retainer 28, which may also serve as a stop for the valve 16.

A shifting bracket 18 is linked to the valve bodies by links 19 and pins 20 and 21, so moving the shifting bracket to the right will swing the valve to a vertical position whereas moving the shifting bracket to the left will swing the valve to a horizontal position. When in the vertical position the full effect of the centrifugal force acts to thrust the valve against the valve seat, whereas when in the horizontal position, none of the centrifugal force acts to thrust the valve against the valve seat.

The governor acts to regulate the fluid pressure, as the passage 11 registers with an annular groove 22 which communicates with passages 23 and 24, and through to an annular groove 25 which communicates with a compartment 26 which is above the head of the valve 16, thus allowing the fluid pressure to act against the head of the valve, and thus this valve acts as a pressure regulator valve, for when the fluid pressure becomes great enough to overcome the force of the spring 17 and the centrifugal force of the valve, the valve will be forced from its seat 16a allowing the fluid to escape through holes 27.

The shifting bracket 18 is moved to the right or left by a lever 29, in the end of which is a pin 30 with a slotted head that receives a ring 31 that is part of the bracket 18. The lever 29 is fastened to a shaft 32 which extends through to the outside of the housing 33. Outside the housing and fastened to the shaft 32 is a lever 34. Thus if the lever 34 is rocked the position of the shifting bracket may be changed to the right or left.

The lever 34 is an adjusting lever and when it is to the left, the shifting bracket will be to the right and the full effect of the centrifugal force of the valve will act against the valve seat, and thus as the speed of the governor increases, the pressure in the passage 11 increases, and a definite relation exists between the pressure in the passage 11 and the speed of the governor. This relation may be called the characteristics of the governor.

If the lever 34 is moved to the right, the shifting bracket will move to the left, and the effect of the centrifugal force of the valve acting against the valve seat will be less than when previously explained, and as the speed of the governor increases, the pressure in the passage 11 increases, but not as much as when previously explained. Thus the speed-pressure relation is different than when previously explained, and the characteristics of the governor are different.

If the lever 34 is moved far enough to the right, the valve body may move to a horizontal position, as viewed in Fig. 1, in which case there is no centrifugal force of the valve acting against the valve seat. Another way to describe the adjustment feature of the valve is: due to rotation of the shaft 2, the valve 16, having a mass, causes a centrifugal force to act in a radial direction from the shaft and through the center of gravity of the mass. This centrifugal force can be resolved into two component forces, one acting along the axis of the valve and which effects the operation of the valve, and the other at right angles to the first component force and acts only to force the valve against the side of the valve body and therefore has no appreciable effect upon the operation of the valve. The magnitude of the component force that operates the valve is equal to the centrifugal force times the cosine of the angle that is made by the intersection of the axis of the valve with the line of direction of the centrifugal force. In Fig. 3, the axis of the valve and the line of direction of the centrifugal force coincide, and the above mentioned angle is therefore 0. The cosine of 0 is 1, therefore the full amount of the centrifugal force effects the operation of the valve. If the valve is moved 90 degrees about the axis shown at B—B the above mentioned angle is 90 degrees, and since the cosine of 90 degrees is 0, there will be no part of the centrifugal force tending to operate the valve. Thus the governor has a very wide range in characteristics. Such a governor is particularly suitable to certain types of automatic, hydraulically controlled, automotive transmissions, and when thus used, the speed of the governor is in response to a member of the transmission, whereas the lever 34, determining the characteristics of the governor, is connected to the engine throttle so that the shift from a low ratio to a higher ratio will occur at a higher speed under heavier throttle conditions.

It is obvious that the valve could be installed so as to operate in a range 180 degrees from the position of the valve shown in Fig. 1, and Fig. 2; that is, the valve would be up as shown in Fig. 2, and the weight 15 would be down. In this case the pressure in the system would decrease with an increase in speed.

Fig. 3 shows a governor using a different type of control valve than is shown in Fig. 1. As before, the governor rotates in response to speed valves about an axis A—A, whereas the valve 16b may be swung about a different axis B—B, for adjusting the characteristics of the governor. When the valve is in the position shown, the full effect of the centrifugal force of the valve acts to control the pressure of the fluid, whereas if the valve is rotated about the axis B—B 90°, the centrifugal force of the valve has no effect on the pressure of the fluid. This adjustment may be accomplished by moving the shifting bracket 18a to the right or left, by means of the ring 31a in cooperation with the lever 29 as has been previously explained. The shifting bracket is keyed to the shaft 2a by a key 35, however the shifting bracket may move axially along the key. Inside the shifting bracket is a helical slot 36 into which projects a pin 37. This pin is securely fastened to the hub of a small gear 38. Thus moving the shifting bracket to the right or left will cause the gear 38 to rotate in respect to the shaft 2a. The gear 38 meshes with a gear 39 fastened to the valve body 14a, to cause rotation of the valve body about the axis B—B. The valve is rotated about the axis A—A by means of two brackets or arms 40 and 41, which are keyed to the shaft 2a by keys 42 and 43.

The fluid from the source of pressure enters as before, through the passage 23a, and then to passages 44 and 45. The controlled pressure leaves the valve through passages 46, 47, and 48.

It is sometimes desireable to control more than one controlling mechanism with different speed-pressure characteristics, and when this is desired, the two (or more) valves may be of different weight and have separate passages for the controlled fluid pressure; such a passage 48a is shown in Fig. 3.

The operation of the valve is as follows: The pressure exists in the passage 45. If the valve, due to a slight centrifugal force is moved slightly outward (or down as viewed in Fig. 3), a shoulder 49 of the valve will allow communication of the pressure into a compartment 50, and then to the passage 46. As soon as pressure exists in compartment 50, it will act upon a head of enlarged diameter 51 of the valve tending to hold the valve up, and when forced up high enough will cause a shoulder 52 to allow the passage 46 to register with an outlet port 53 and thus release all the pressure in passage 46. Thus it is evident that when the centrifugal force is small there will be practically no pressure in the passage 46. On the other hand it is evident that when the centrifugal force tending to force the valve down is great, it will overcome the force of the pressure acting upon the enlarged head of the valve and the valve will remain down and thus the pressure will be the same in the passages 45 and 46.

The action of this valve is the same as previously described for the valve shown in Fig. 2. As the speed increases the pressure in the passages 46, and 48 increases, giving a definite speed-pressure relation. This speed-pressure relation may be changed by changing the position of the valve about the axis B—B. This can be done while the governor is in operation by moving the adjusting lever 34.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

What I claim is:

1. In a hydraulic governor control, the combination of a pressure system, means for delivering fluid under pressure to said system, a shaft, an arm extending from said shaft, a valve body pivotally mounted on said arm, a pressure regulating valve within said valve body cooperating with said pressure system for controlling the pressure delivered by said system, means for rotating said shaft responsive to the speed of an element of the apparatus to be governed for causing a centrifugal force effect on said valve for controlling said valve, and means for swinging the valve about its pivot mounting for changing the said centrifugal force effect on said valve.

2. In a hydraulic governor control, the combination of a pressure system, a source of fluid pressure communicating with said system, a pressure regulating valve communicating with said system for controlling the pressure delivered by said system responsive to the effect of a centrifugal force controlling said valve, an axis about which the said valve rotates for causing a centrifugal force for the valve, and a second axis about which the valve may rotate, which rotates with the valve about the first mentioned axis, for varying the effective value of the centrifugal force that controls the said valve.

3. In a hydraulic governor control, the combination of a centrifugally controlled hydraulic governor including a valve rotatable about an axis of rotation for controlling said valve by centrifugal force giving definite pressure-speed of rotation characteristics for the governor control, and means for changing the angle of the valve in respect to the said axis of rotation for changing the effective centrifugal force acting to control said valve and thus changing the pressure-speed of rotation characteristics of the governor control.

4. In a hydraulic governor control, the combination of a pressure system, means for delivering fluid under pressure to said system, a governor, means for rotating the governor responsive to speed of an element of the apparatus to be governed, said governor including a valve body, valve means having a mass within said valve body and cooperating with said system for controlling the pressure of said system responsive to a centrifugal force caused by speed of rotation of said mass, said centrifugal force having a component force acting along the axis of said valve means for actuating said valve means in response to the magnitude of said component force, the magnitude of said component force being variable in respect to the magnitude of said centrifugal force and related to an angle made by the intersection of the axis of said valve means with the line of direction of the said centrifugal force, and adjustable means for varying the said angle for varying the magnitude of said component force in respect to the magnitude of the said centrifugal force, said last named means being capable of adjustment while the governor is in operation.

CLIFTON R. ROCHE.